United States Patent [19]

Tamaru

[11] Patent Number: 4,788,639
[45] Date of Patent: Nov. 29, 1988

[54] FREQUENCY-CODED MULTI-LEVEL INTERRUPT CONTROL SYSTEM FOR A MULTIPROCESSOR SYSTEM

[75] Inventor: Kiichiro Tamaru, Tokyo, Japan

[73] Assignee: Kabushiki Kaisha Toshiba, Kawasaki, Japan

[21] Appl. No.: 863,948

[22] Filed: May 16, 1986

[30] Foreign Application Priority Data

May 22, 1985 [JP] Japan ................................ 60-109558

[51] Int. Cl.⁴ ............................................. G06F 13/26
[52] U.S. Cl. ..................................................... 364/200
[58] Field of Search ... 364/200 MS File, 900 MS File, 364/130–133; 340/825.5, 825.51, 825.71

[56] References Cited

U.S. PATENT DOCUMENTS

| | | | |
|---|---|---|---|
| 3,999,165 | 12/1976 | Kita et al. | 364/200 |
| 4,091,447 | 5/1978 | Dillon et al. | 364/200 |
| 4,103,335 | 7/1978 | Vitali | 364/900 |
| 4,563,758 | 1/1986 | Paternostro | 364/418 X |
| 4,600,988 | 7/1986 | Tendulkar et al. | 364/131 X |
| 4,628,437 | 12/1986 | Poschmann et al. | 364/131 |

*Primary Examiner*—Raulfe B. Zache
*Assistant Examiner*—Florin Munteanu
*Attorney, Agent, or Firm*—Finnegan, Henderson, Farabow, Garrett & Dunner

[57] ABSTRACT

A multi-level priority interrupt system is used for controlling the access of input/output control devices to a host computer which is connected to the devices and controls their operation. The input/output control devices each of which is contained on a different LSI chip, output different levels of interrupt requests to the host computer. During operation, each input/output control device outputs an interrupt signal of a frequency determined by a level of an interrupt to be sent to the host computer. The interrupt signal is supplied from one external terminal of the input/output control device. Upon receipt of the interrupt signals, the host computer determines a priority of the interrupt from the frequency of the signal and then executes a corresponding interrupt routine.

6 Claims, 2 Drawing Sheets

FREQUENCY-CODED MULTI-LEVEL INTERRUPT CONTROL SYSTEM FOR A MULTIPROCESSOR SYSTEM

BACKGROUND OF THE INVENTION

This invention relates to the improvements of an information processing system including a high-performance input/output controller.

There are many known information processing systems each of which includes input/output devices and a host computer for controlling the operation of the input/output devices. The central processing unit (CPU) of this type of information processing system, generally uses several interrupt levels (interrupt priorities). One interrupt level was used for one input/output device. An example of this system is described in *The Information Processing Handbook*, published by the information processing academy of Japan.

However, high-performance, multi-operation input/output control devices have come to use several interrupt levels for one input/output control device. The information processing system whose control device has different interrupt levels, is also disclosed in the above publication. When one input/output control device outputs many interrupt priorities of different levels to an external CPU, many signal lines must be used, each for one interrupt priority. For this reason, the conventional information processing system has the fault of using many connections between the input/output device and CPU. Especially when the input/output control device is used in a large scale integrated circuit (LSI), there is the problem of the increase in the number of pins of the LSI chip, and the increased size of the chip. The increase of the number of pins and the size of the chip are undesirable from an economical point of view.

Further, it is sometimes necessary to change the interrupt level of high performance input/output control devices. In earlier systems, the interrupt level was determined by the relationship of the connections between the input/output control device and the CPU. For this reason, level changes in the systems were difficult.

SUMMARY OF THE INVENTION

An object of the present invention is to provide an information processing system in which the interrupt levels can be changed easily and flexibly by making possible the output of different level interrupt priorities from one input/output control device, using one signal line.

To achieve the above object, there is provided a control device comprising:

a CPU (111) for controlling a controlled object according to a predetermined program and for outputting, as needed, interrupt requests, with different levels;

memory (117, 119) connected to said CPU (111) for storing the predetermined program; and circuit (115) for outputting an interrupt signal, to an external device, with a frequency which is different for each of said interrupt level, in response to an interrupt request and the interrupt level when said CPU (111) produces the interrupt request signal to external device.

With such an arrangement, the input/output control device according to this invention shows the following effects.

In the control devices, there are cases when the changing of interrupt levels is necessary. On the other hand, this invention enables the interrupt level to easily be changed. Further, one signal line is used to send the interrupt signal to external devices. The connections to the external devices becomes easier.

Furthermore, when the input/output device according to this invention is used in a single LSI chip, this invention is very effective in reducing the number of pins and chip size, and in reducing the cost.

DETAILED DESCRIPTION OF THE PREFERRED EMBODIMENTS

Figure 1:
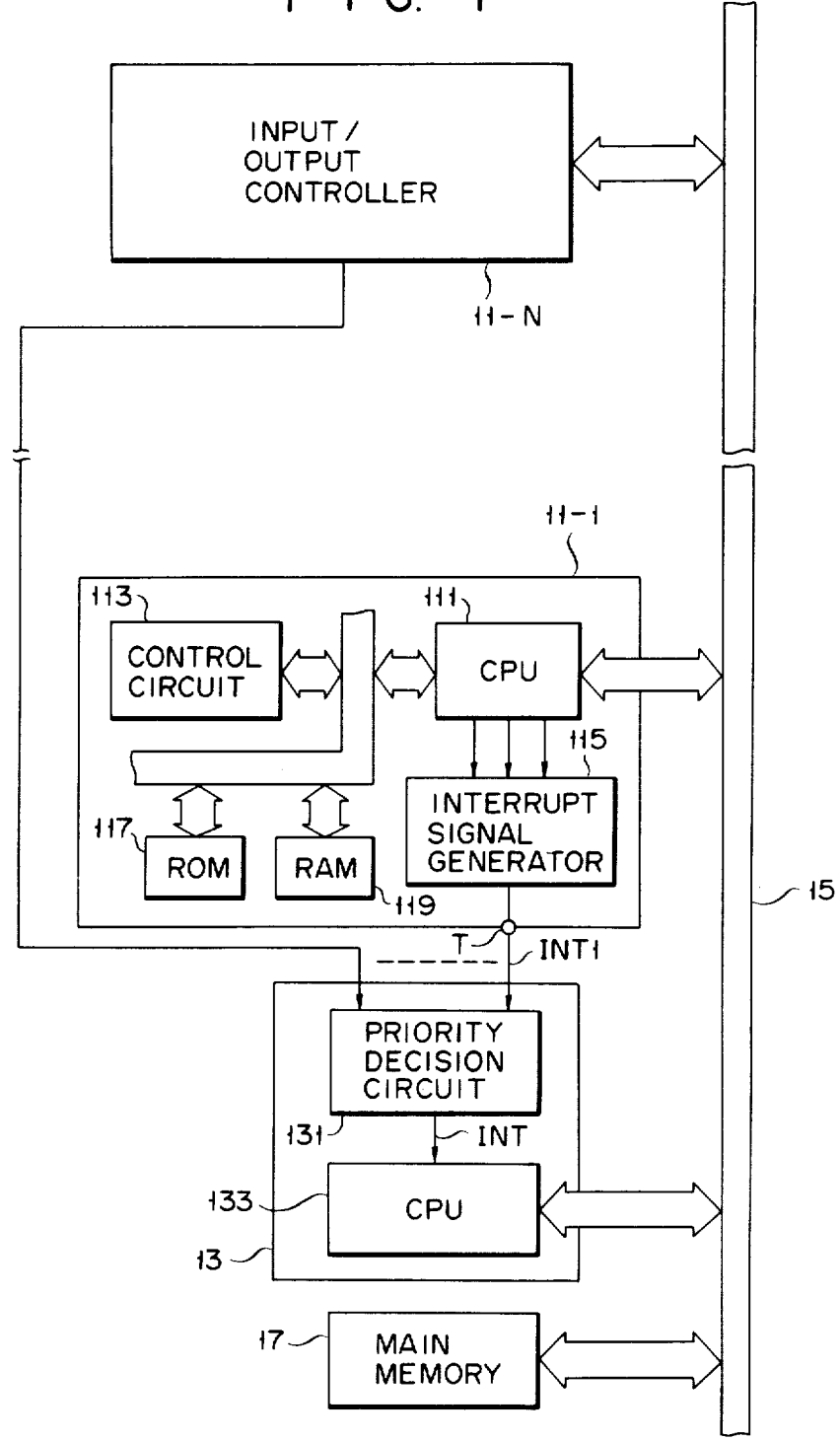
FIG. 1 is a block diagram showing a configuration of an information processing system according to this invention.

An embodiment of this invention will be described referring to the accompanying drawings. FIG. 1 shows a configuration of an information processing system according to this invention. The system shown in FIG. 1 can totally control an LAN (local area network) or a WAN (wide area network), and image and signal processing. The input/output device 11 (11-1 through 11-N) is provided for each controlled object such as a signal and image processor, LAN or WAN. It is assumed that every input/output control device uses four interrupt levels. Each input/output control device contains a CPU 111, control circuit 113, interrupt signal generating circuit 115, ROM 117, RAM 119, and the like. Each input/output device 11 is packed into one large scale integrated circuit (LSI). CPU 111 performs the control and operation inherent to the input/output device according to the program stored in ROM 117. Control circuit 113 controls the operation of the internal circuits of the input/output device. The interrupt signal generating circuit 115, in response to the CPU request, outputs an interrupt signal INT1. Signal INT1 passes through terminal T of the LSI and one signal line, and is supplied to the host computer to be described later. ROM 117 stores the program which determines the operation of CPU 111. RAM 119 stores, as needed, various kinds of data, such as operation results by CPU 111 and output from controlled-objective systems.

Host computer 13 is used for controlling all of the different input/output control devices 11. Host computer 13 is equipped with priority decision circuit 131 which receives interrupt signal from the different input/output devices 11. Priority decision circuit 131 selects the highest priority interrupt signal from the interrupt signals INT1 received from the different control devices, and sends it out. The priority decision circuit 131 returns an ACK signal to the input/output device which sent the selected interrupt signal. The signal INT that was outputted from the priority decision circuit 131 is output to the interrupt signal input terminal of the CPU 133 in the host computer 13.

The input/output devices 11 are connected, by bus (data bus and address bus) 15, to host computer 13. Main memory 17 is also connected to bus 15. This main memory 17 stores all kinds of data necessary for the operation of input/output control device 11 and host computer 13. The arrangements of CPUs 111 and 133, control circuit 113, ROM 117, RAM 119 and main memory 17 may be any well-known arrangement.

Figure 2:
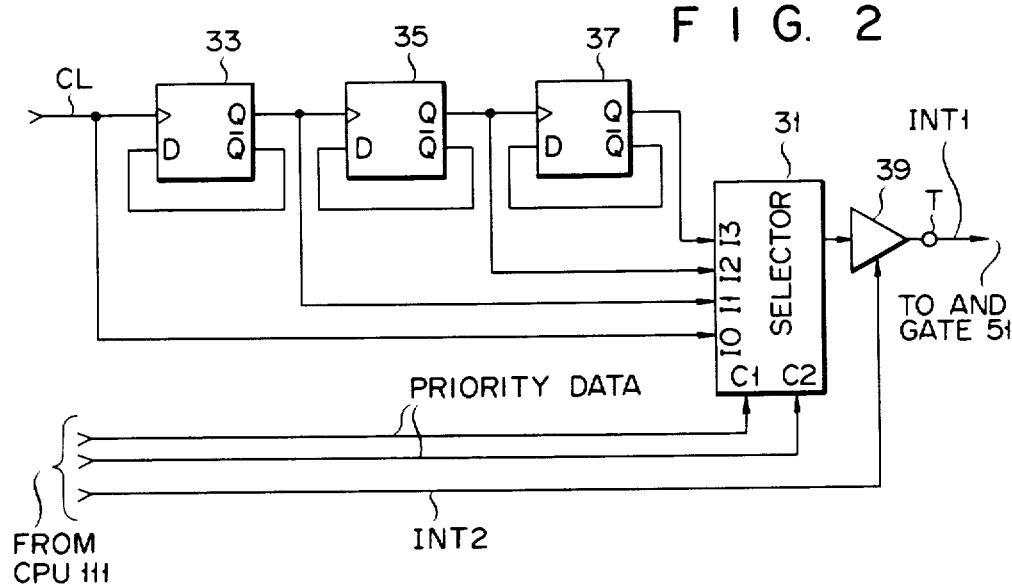
FIG. 2 is a circuit diagram of the circuit which outputs a signal of frequency which is different for each interrupt level.

Interrupt signal generating circuit 115 is arranged as shown in FIG. 2. Two-bit data representative of the level of the interrupt request output from CPU 111 of input/output device 11, is supplied to the input terminals C1 and C2 of selector 31. Clock signal CL is supplied to the clock terminal of first D type flip-flop (FF) 33. The $\overline{Q}$ output of FF 33 is supplied to the D input terminal of FF 33. For this reason, first DFF 33 divides the frequency of the clock signal in half. The Q output of first DFF 33 is connected to the clock input terminal of second DFF 35. Second FF 35 divides the frequency of the input signal in half. The Q output of second DFF 35 is supplied from the clock input terminal of third DFF 37. The third DFF 37 halves the frequency of the input signal.

Clock pulse signal CL is supplied to the input terminal IO of the 0th bit of selector 31. The Q output signal of first DFF 33 is input to the input terminal I1 of the first bit of selector 33. The Q output signal of second DFF 35 is input to the second bit input terminal I2 of selector 31. The Q output signal of third DFF 37 is supplied to the third bit input terminal I3 of selector 31. The output signal of selector 31 is supplied to buffer 39 with a control terminal. Supplied to this control terminal of buffer 39 is the interrupt signal INT2 from CPU 111. The output terminal of buffer 39 is connected to host computer 13, through one of the pins T of LSI and the signal line.

Figure 3:
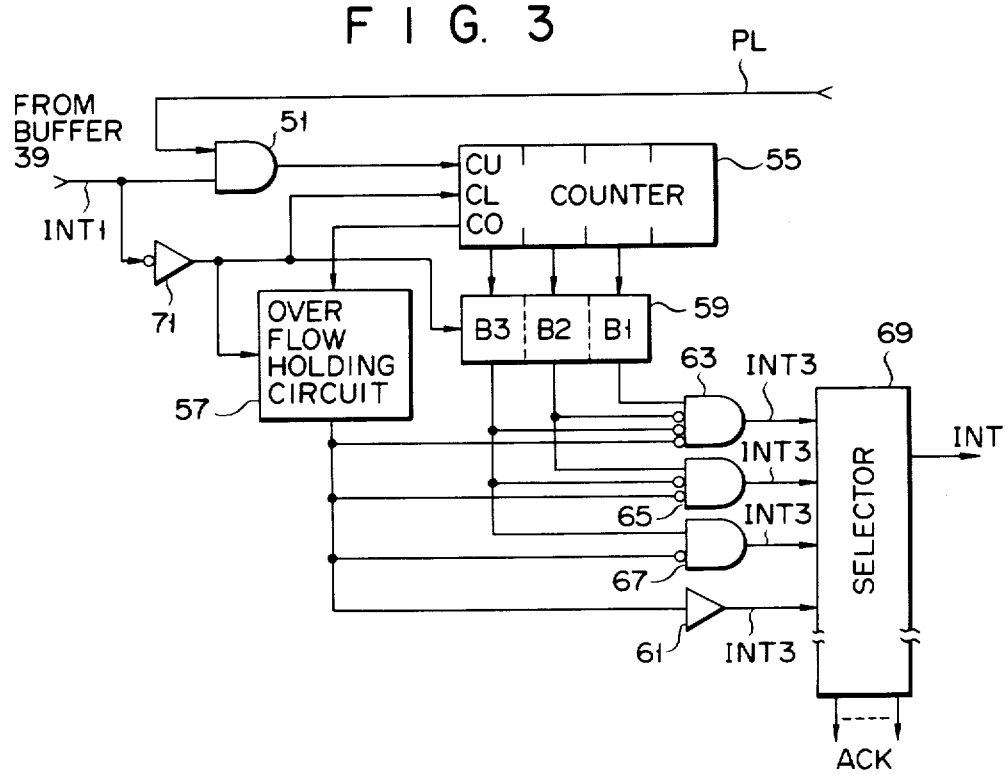
FIG. 3 is a circuit diagram of a circuit for distinguishing an interrupt level according to the frequency of the received interrupt signal.

Priority decision circuit 131 is arranged as shown in FIG. 3.

Buffer 39, as shown in FIG. 2, supplies its output to one terminal of AND gate 51. The frequency of clock signal PL is approximate to that of clock signal CL. The output of AND gate 51 is supplied, as a count-up signal, to 4-bit binary counter 55. The overflow output of counter 55 is supplied to overflow holding circuit 57. The other bits (3 bits in this instance) than least significant bit (LSB) of the count by counter 55 are supplied to counter output holding circuit 59. Buffer 61 amplifies the output signal of overflow holding circuit 57. When the third bit B3 and the second bit B2 of circuit 59 are at L level, and the first bit B1 is at H level (data "1"), the logic condition of the first logic gate 63 holds, and that gate produces an H level signal. When the output of overflow holding circuit 57 is at L level (data "0"), the third bit B3 of counter output holding circuit 59 is at L level, and the second bit B2 is at H level, the logic condition of the second logic gate 65 holds and it produces an H level signal. When the output of overflow holding circuit 57 is at L level, and the third bit B3 of counter output holding circuit 59 is at H level, third logic gate 67 holds in its logic condition and produces an H level signal. The output of buffer 39 is also connected to the input terminal of inverter 71. The output terminal of inverter 71 is connected to the clear terminal of counter 55, and to the trigger terminals of overflow holding circuit 57 and counter output holding circuit 59.

The above arrangement is used for every input/output control device 11. The outputs INT3 of logic gates 61 to 67 shown in FIG. 3 are input to select circuit 69. For example, when N input/output devices 11 are used, the signal lines of 4×N are connected to the input terminals of selector circuit 69. Circuit 69 selects one signal (interrupt signal) from its input signals according to the priority order as already set, and supplies it as interrupt signal INT to CPU 133. Selector circuit 69 returns an ACK signal to the input/output device which output the selected interrupt signal INT3.

The operation of the data processing system arranged as shown in FIGS. 1 to 3 will be given. Each input/output control device 11 performs the control assigned to it according to the protocol as preset to the control device. More specifically, CPU 111 executes various types of operations and controls according to a program stored in ROM 117. For example, each input/output control device 11 may control LAN, WAN, image processing device, signal processing device, or the like.

In each of the above control operations, it is assumed that CPU 111 decided that the interruption to the host computer 13 is needed. As stated above, CPU 111 outputs the interrupt requests of four different levels. For example, when CPU 111 is controlling a LAN, it produces different levels of interrupts according to the cases. When receiving data, it produces the interrupt request at the 3rd level (lowest level). When receiving the data to be processed in early stage, it produces the interrupt request at the 2nd level. When the far end appears to be down during communication, the 1st level interrupt request is produced. When a fault which appears to affect the overall operation of the system, the 0th level (the highest level) interrupt request is output. When each CPU 111 sends a request to host computer 13, it causes the interrupt request signal INT2 to go high, and produces 2-bit priority data for indicating an interrupt level. When the interrupt level is the 0th level (highest level), CPU 111 outputs priority data "00". Selector 31 selects a signal (signal CL) as received at its input terminal, and outputs it. When the interrupt level is at the 1st level, CPU 111 produces priority data "01". Selector 31 selects the signal (Q output signal of DFF 33, i.e. a signal with a frequency of ½ that of signal CL), which is received at the 1st input terminal I1, and outputs the selected signal. When the interrupt level is at the 2nd level, CPU 111 outputs priority data "10". Selector 31 selects a signal (Q output signal of DFF 35, or a signal with a frequency ¼ that of signal CL), which is received at, the 2nd input terminal I2, and outputs the selected signal. When the interrupt level is at the 3rd level, CPU 115 produces priority data "11". Upon receipt of this data, selector 31 selects a signal received at the 3rd input terminal. This signal is the Q output signal of DFF 37, and has frequency ⅛ that of signal CL. Then, selector 31 produces the selected signal. When CPU 111 requests an interrupt, the signal INT2 goes high, and buffer 39 is enabled. As a result, the output signal of selector 31 is transferred, as an interrupt signal INT1, to host computer 13. The input/output control device 11 produces interrupt signal INT1 whose frequency corresponds to the interrupt level. In this embodiment, the interrupt signal of highest frequency corresponds to the highest level interrupt (level D). Only one pin (T) is required for the interrupt signals of the LSI chip with the input/output control device 11, and only one interrupt signal line is needed from each input/output control device 11 to host computer 13.

Host computer 13 controls the operation of input/output control devices 11, data transmission between input/output control devices 11 (for example, data transmission between LAN and the image processing system), and performs many other control operations. This control is provided for synthetically controlling the overall system, and its level is one level higher than that of the control operation of each input/output control device 11. The input/output control device 11 executes the control operation of the input/output control device alone, while the host computer executes the control operation for the whole system, independently from the control operation of the input/output control devices.

The operation of host computer 13, when it is supplied with interrupt signal INT1 from input/output control device 11, will be described. A toggle signal (interrupt signal) whose frequency changes with the interrupt level, is supplied from buffer 39 to AND gate 51 of priority decision circuit 131. Binary counter 55 is a four-bit counter. During the period that the interrupt signal INT is at H level, counter 55 counts clock pulses PL. When the voltage level of the interrupt signal INT1 changes from H level to L level, the output of inverter 71 goes high. In synchronism with this, the counter output of counter 55 is stored in counter output circuit 59, and the counter 55 and the overflow holding circuit 57 are cleared. There is a danger that error may occur in the number of clock as counted due to the phases of the clock signal PL and the interrupt, signal INT2. For this reason, the LSB of the count output from counter 55 is ignored, and not stored in the counter output circuit 59.

As described above, as the toggle frequency of the interrupt signal INT1 is higher (the number of counted clock by counter 55 is smaller), the interrupt level is higher. When the number of clocks counted exceeds the bit width of counter 55, overflow signal output is raised H level, and stored in overflow holding circuit 57. For this reason, the output of buffer 61 is raised to H level, and it is judged as an interrupt request of level "3" (lowest level). This state is maintained till the overflow will not occur in the following count. At this time, no logical conditions hold in first to third logic circuits 63, 65 and 67, and their outputs are at L level. When the number of clocks counted is within the bit width range of counter 55, the interrupt level is at any of the following three levels. When only the second bit of the counter 55 (the first bit B1) of counter output holding circuit 59) is at H level, the logic condition of first logic gate 63 holds to produce an H level signal. As a result, it is judged to be the interrupt request at level "0" (highest level). When the third bit of the counter 55 (second bit B2 of counter output holding circuit 59) is at H level, the logic condition of second logic gate 65 holds to produce a H level signal. By this signal, CPU judges that the interrupt request at level "1" is produced. When the fourth bit of counter 55 (third bit B3 of counter output holding circuit 59) is at H level, third logic gate 67 is logically conditioned and produces an H level signal. With this H level signal, CPU determines that the interrupt request signal at level "2" is produced.

Every time the voltage level of interrupt signal INT1 changes from H level to L level, the output of inverter circuit 71 clears the contents of counter 55. The contents of counter 55 immediately before the counter is cleared is latched into counter output holding circuit 59. In this way, the interrupt level specified by the frequency of the interrupt signal INT1 is determined.

When a plurality of interrupt signal INT3 are simultaneously supplied from a plurality of input/output control devices 11, selector 69 selects one interrupt signal according to a predetermined priority order and supplies it to CPU 133. For example, if the interrupt request at level "1" from input/output control device 11-1 and the interrupt request at level "1" of input/output control device 11-N are simultaneously supplied to select circuit 69, the interrupt request of input/output control device 11-N, for example is supplied to CPU 133 according to the predetermined priority order. Select circuit 69 sends an ACK signal to the input/output control device 11 which outputted selected interrupt signal INT3. In response to the inputted interrupt signal, CPU 133 executes a predetermined program.

One of the features of the interrupt system according to the present invention resides in determining the interrupt level according to the frequency of the interrupt signal on the interrupt signal line. The arrangement of the interrupt level determining circuit may variously be made if necessary.

In this embodiment, as the interrupt level is higher, the interrupt signal as a high frequency toggle signal is provided. However, this invention is not limited to such. For example, a relationship between interrupt level and the frequency can be set appropriately. The circuit arrangement for outputting the interrupt signals of different frequencies is not limited to that shown in FIG. 2.

In the case of high performance input/output control devices, there are cases that the input/output control conditions require the change of the interrupt level. In the conventional interrupt system, the connections between the input/output control device and host computer 13 solely determines the interrupt level. This fact makes the compliance with the changed interrupt level difficult. On the other hand, in the present invention, a priority of the interrupt level can be changed by software.

When the input/output control device 11 according to the present invention is assembled into the one-chip LSI, the number of pins and the chip size are reduced, leading to cost reduction. In this respect, the invention is very useful. This invention is not limited to this, however. For example, also when the input/output device is constructed on a board, for example, the number of connections can also be reduced.

While having been described using the information processing system with input/output control devices and the host computer, this invention is not limited to this. This invention is applicable for various types of control devices which need to output the interrupt request of a plurality of levels to external devices, and further for all kinds of information processing systems with such control devices.

What is claimed is:

1. An information processing system having a plurality of controlled objects connected to a host system, said objects being operative to interrupt the host system upon the occurrence of predetermined events, said system comprising:

a plurality of subsystems, each operative to control a corresponding one of said plurality of controlled objects, each one of said subsystems upon the occurrence of a predetermined event being operative to output an interrupt signal having a selected frequency corresponding to one of a plurality of interrupt levels;

a plurality of interrupt lines;

a host system connected to each of said plurality of subsystems by a respective one of the plurality of interrupt lines for receiving from each of said subsystems an interrupt signal at any one of said plurality of interrupt levels, said host system being operative to determine a highest priority among the received interrupt signals including simultaneous interrupot signals in accordance with the frequencies of said interrupt signals and operative to process the determined highest priority interrupt signal; and a data transmission system connected to said subsystems and said host system for transmitting data.

2. An information processing system according to claim 1, wherein each of said plurality of subsystems comprises:

a central processing unit for controlling each of said controlled objects according to a predetermined program and operative to generate an interrupt request;

means connected to said central processing unit for storing said predetermined program; and interrupt means responsive to said interrupt request for outputting the interrupt signal.

3. An information processing system according to claim 2, wherein:

said interrupt means comprises:

means for selecting a frequency corresponding to one of the plurality of interrupt levels in responses to said interrupt request and for outputting the interrupt signal in accordance with the selected frequency.

4. An information processing system according to claim 1, wherein each of said plurality of subsystems is contained in a one-chip LSI and said interrupt signal is supplied to said host system through one external input/output terminal of the one-chip LSI.

5. An information processing system according to claim 1, wherein said host system comprises:

outputting means for determining a priority for the received interrupt signals in response to the frequency of the interrupt signals on the different interrupt lines at times when a plurality of the interrupt signals are received simultaneously;

means for receiving said determined priorities and outputting one interrupt request corresponding to said interrupt signal having a highest priority according to a predetermined priority order; and a central processing unit responsive to said one interrupt request from said outputting means for executing a corresponding control operation.

6. An information processing system according to claim 1, wherein the occurrence of the interrupt signal from each of said plurality of subsystems is independent of the frequency of said interrupt signals.

* * * * *